United States Patent [19]

Coates et al.

[11] 3,933,750
[45] Jan. 20, 1976

[54] NOVEL STABILIZED POLYMER COMPOSITIONS

[75] Inventors: Harold Coates, Wombourne; John Desmond Collins, Albrighton; Iftikhar Hussain Siddiqui, Birmingham, all of England

[73] Assignee: Albright & Wilson Limited, Oldbury near Birmingham, England

[22] Filed: July 22, 1974

[21] Appl. No.: 490,240

Related U.S. Application Data

[62] Division of Ser. No. 359,176, May 10, 1973, abandoned.

[52] U.S. Cl.. 260/45.75 S; 260/45.95 R; 260/429.7
[51] Int. Cl.² .................................... C08G 6/00
[58] Field of Search .............. 260/45.75 S, 45.95 R

[56] References Cited
UNITED STATES PATENTS

| | | | |
|---|---|---|---|
| 2,631,990 | 3/1953 | Mack et al. | 260/45.75 |
| 2,731,484 | 1/1968 | Best | 260/45.75 |
| 2,998,441 | 8/1961 | Jackson | 260/45.75 |
| 3,019,247 | 1/1962 | Mack et al. | 260/45.75 |
| 3,222,317 | 12/1965 | Kauder | 260/45.75 |
| 3,297,629 | 1/1967 | Kauder | 260/45.75 |
| 3,398,114 | 8/1968 | Pollack | 260/45.75 |
| 3,433,763 | 3/1969 | Suzuki et al. | 260/45.75 |
| 3,637,777 | 1/1972 | Hoch | 260/45.75 |
| 3,642,846 | 2/1972 | Hoch | 260/45.75 |
| 3,665,024 | 5/1972 | Oakes | 260/45.75 |

*Primary Examiner*—V. P. Hoke
*Attorney, Agent, or Firm*—Robert P. Auber; Kenneth G. Wheeless; Robert Spector

[57] ABSTRACT

Organothiotin compounds with low tin content suitable as stabilizers for halogen containing resins e.g. polyvinyl chloride, are of formula $R_1R_2Sn(X) - SC_mH_{2m}S - (Y)SnR_1R_2$, where $R_1$ and $R_2$ are $C_{1-20}$ alkyl, cycloalkyl or phenyl, $m$ is 1–8, X and Y are of formula $-OCOCH = CHCOOCH_2Q_1$, $-S(CH_2)_nCOOCH_2Q_1$, or $-OOC(CH_2)_nS - CH_3S(CH_2)_nCOOR_5$ $SR_4$, $OCOCH = CHCOOR_5$ or $S(CH_2)_2COOR_5$, where $Q_1$ is $-C(Q_2)(CH_2Z)_2$, where $Q_2$ is H, $C_{1-6}$ alkyl or $CH_2Z$, Z is $OOCR_3$ $OOC(CH_2)_nSR_4$, $-OOCR_6COOR_5$ or a pair of Z is $-OOC(CH_2)_aS$ $CHR_3S(CH_2)_nCOO-$, $R_3$ is $C_{1-20}$ alkyl optionally substituted phenyl or alkylphenyl or if two $R_3$ groups are present in the molecule, they may constitute a single bond between the carbon atoms immediately adjacent to said $R_3$ radicals, $C_{1-20}$ alkylene, $C_{2-20}$ alkenylene or optionally substituted phenylene, $R_4$ is $C_{1-20}$ alkyl, optionally substituted $C_{1-6}$ alkyl or two groups $R_4$ are optionally substituted $C_{1-20}$ alkylene, $C_{2-20}$ alkenylene or $C_{5-6}$ cycloalkylene, $R_5$ is $C_{1-20}$ alkyl, optionally substituted phenyl or alkylphenyl or if two $R_5$ groups are present, these may be bonded together to form a $C_{1-20}$ alkylene radical, $R_6$ is a single bond, $C_{1-20}$ alkylene or $C_{2-20}$ alkenylene, $n$ and $a$ are 1–6.

6 Claims, No Drawings

NOVEL STABILIZED POLYMER COMPOSITIONS

This is a divisional of application Ser. No. 359,176 filed May 10, 1973, now abandoned.

The present invention relates to organotin compounds, processes for preparing them and to their use as stabilisers for polymeric materials in particular halogenated resins such as polymers and copolymers of vinyl and vinylidene chloride.

The use of organotin compounds containing sulphur as stabilisers for halogenated resins has for many years been recognised as being highly effective. However, the compounds employed have normally been those having a comparatively high tin content and so, in view of the high cost of tin, are expensive relative to other available stabilisers. Thus, despite their high efficiency these compounds are still not as widely used as other, less effective, materials.

The compounds of the present invention are sulphur-containing organotin compounds which have a lower tin content than most conventional sulphur-containing organotin compounds and so are potentially cheaper. The stabilising ability of some of them may match that of some of the conventional materials and so may be able to achieve the same degree of stabilisation (on an equal tin basis) for lower cost.

The present invention provides an organothiotin compounds of the formula

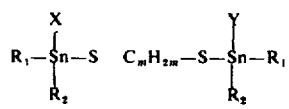

wherein each of $R_1$ and $R_2$, which are the same or different, is an alkyl group of 1–20 carbon atoms, a cycloalkyl or phenyl group $m$ is an integer of 1–8, each of X and Y, which are the same or different is of formula

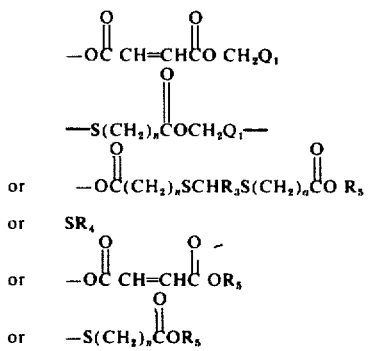

wherein $Q_1$ is of formula

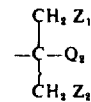

and $Q_2$ is hydrogen, an alkyl group of 1–6 carbon atoms or $CH_2Z_3$, in which $Z_3$ is as defined for Z, or $Z_2$ below, and each of $Z_1$ and $Z_2$, which are the same or different, is of formula,

or a pair of radicals selected from among $Z_1$, $Z_2$ and $Z_3$ may be bonded together to form a group of formula

wherein $R_3$ is an alkyl group of 1 to 20 carbon atoms, a substituted or unsubstituted phenyl group or an alkyl phenyl group, which is substituted or unsubstituted, or if two $R_3$ groups are present on the same molecule, they may form a single bond between the carbon atoms immediately adjacent to each of the $R_3$ radicals, an alkylene group of 1 to 20 carbon atoms, an alkenylene group of 2 to 20 carbon atoms or a substituted or unsubstituted phenylene group.

$R_4$ is an alkyl group of 1 to 20 carbon atoms or substituted or unsubstituted phenyl alkyl group with 1 to 6 carbon atoms in the alkyl group, or two groups $R_4$ together are an alkylene group of 1 to 20 carbon atoms which is unsubstituted or substituted by at least one phenyl group, or an alkenylene group of 2 to 20 carbon atoms or cycloalkylene group of 5 to 6 carbon atoms, $R_5$ is an alkyl group of 1 to 20 carbon atoms, a substituted or unsubstituted phenyl group or an alkylphenyl group, which is substituted or unsubstituted, or two groups $R_5$ together are an alkylene group of 1 to 20 carbon atoms, $R_6$ is a single bond, an alkylene group of 1 to 20 carbon atoms or an alkenylene group of 2 to 20 carbon atoms or a substituted or unsubstituted phenylene group, and each of $a$ and $n$, which are the same or different, is an integer of 1 to 6.

Preferably only one of X and Y is of formula

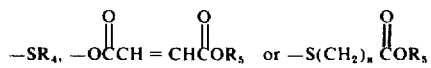

When one of X and Y is of formula $SR_4$, the group $R_4$ is usually an alkyl group of 1 to 20 carbon atoms.
Preferably $Q_1$ is of formula

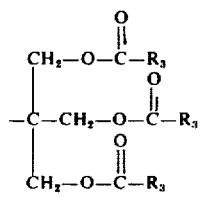 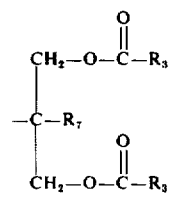

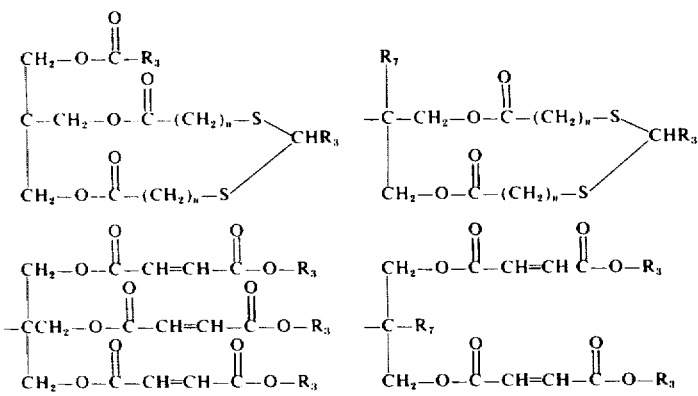

In preferred compounds of the invention, $R_1$ and $R_2$ are n-butyl or n-octyl groups, $R_3$ is an alkyl group of 8–20 carbon atoms, preferably an n-undecyl group, or a hydroxyphenyl group, preferably an o-hydroxyphenyl, $R_4$ is an alkyl group of 8–20 carbon atoms, preferably an n-dodecyl group, $R_5$ is an alkyl group of 8–20 carbon atoms, preferably an iso-octyl or 2-ethylhexyl group, each of $n$ and $a$ which are the same or different, is 1 or 2, $n$ being preferably 2 and $a$ 1, the group $C_m H_{2m}$ is linear (ie. of formula $(CH_2)_m$) and $m$ is especially 6.

Examples of particular compounds according to the present invention are:

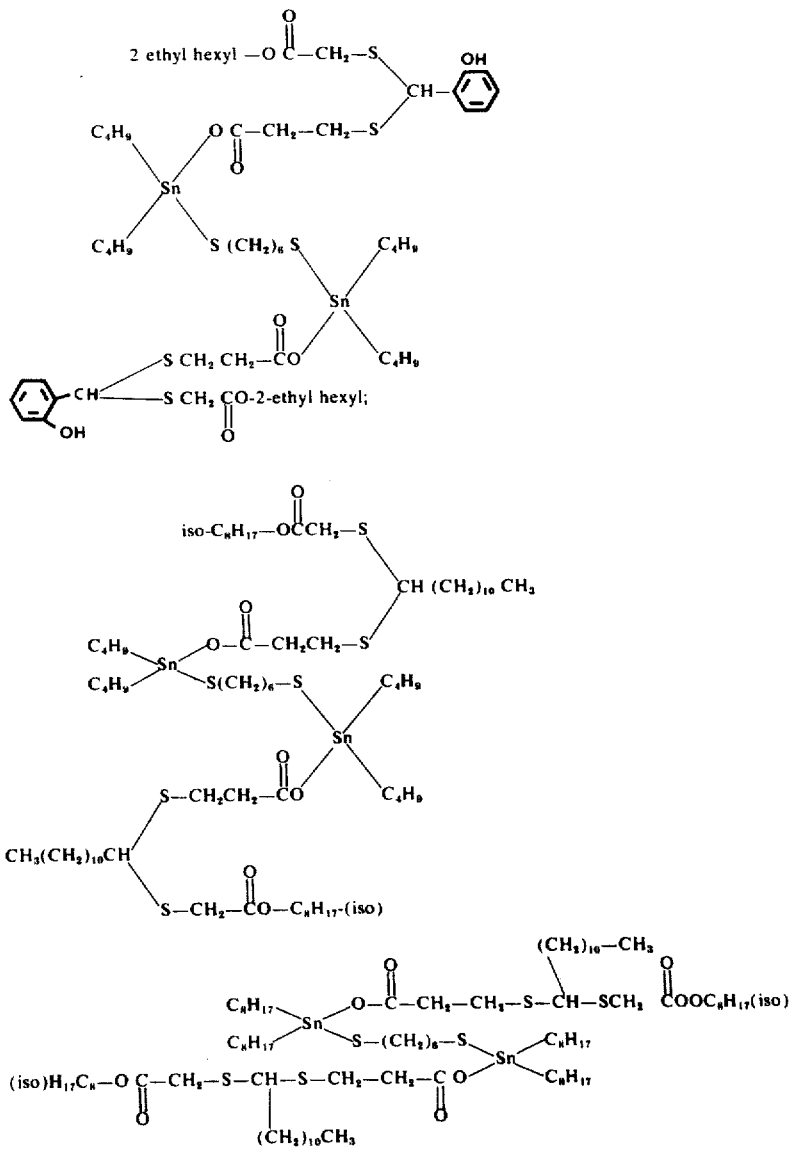

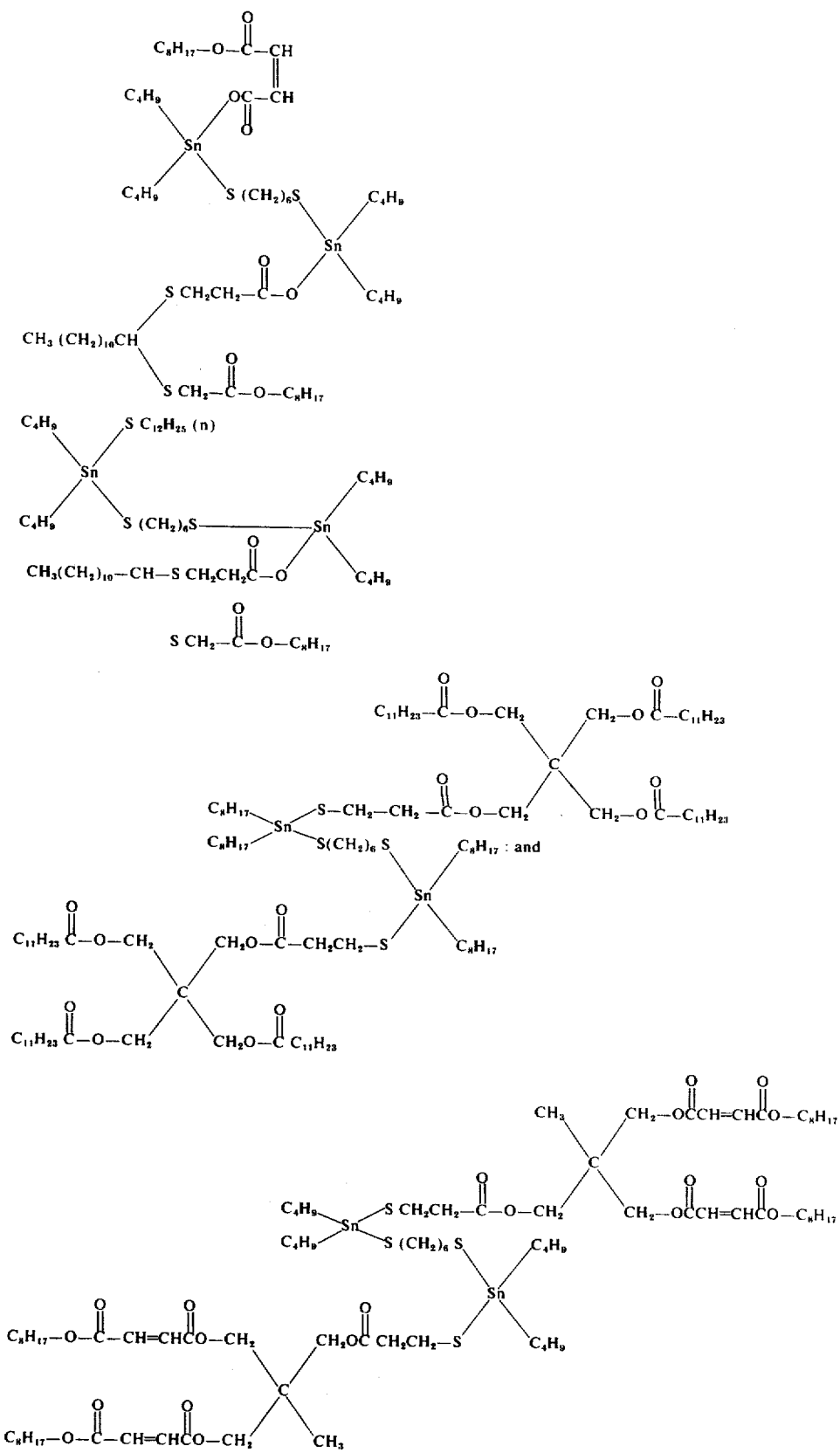
The compounds of the invention, having the structure given, are believed to be the products of the process of the invention which comprises reacting an organotin compound of the formula:
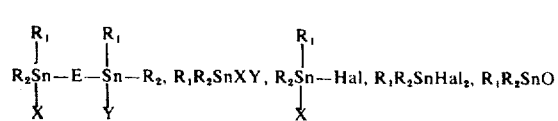

or $R_1R_2Sn\,S$ with a compound of the formula $HS(C_mH_{2m})SH$ and at least one compound of formula $HX$ and $HY$, wherein E is oxygen or sulphur, Hal is halogen and $R_1R_2$, X, Y and m are as defined above. Preferably the organotin compound is of formula

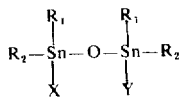

and is usually prepared by reaction of a compound of formula $R_1\,R_2\,Sn\,XY$ with one of formula $R_1\,R_2\,SnO$.

Frequently all of the reactants will be mixed together and heated in a suitable solvent, such as an aromatic hydrocarbon e.g. toluene, or xylene, or other organic solvents such as hexane, petrol, or cyclohexane. Normally it will be desirable to have an acidic catalyst present such as p-toluene sulphonic acid, hydrochloric acid or metal chlorides suitable as Friedel Craft catalysts such as zinc chloride.

Compounds of the formula $R_1R_2Sn\,X_2$, $R_1R_2SnY_2$ and $R_1R_2Sn\,XY$ wherein at least one of X and Y is of formula

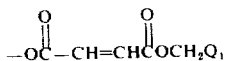

are described and claimed in our co-pending application Ser. No. 359,177 filed May 10th 1973. They may be prepared by a process which comprises in step (a) reacting an alcoholic component which is at least one of pentaerythirtol and a triol of formula $(HOCH_2)_3CR_7$, maleic acid (or a derivative thereof) and one or more blocking agents, which are (i) of formula $R_3\,COOH$, or formula $R_6\,(COOH)_2$ and $R_5$—OH or of formula HOOC $R_6$ COOR$_5$, of formula HOOC $(CH_2)_n$ SR$_4$ or [HOOC $(CH_2)_2S]_2CHR_3$, or $HOOC(CH_2)_n$ SH followed by Hal $R_4$, Hal$_2$ CHR$_3$ (Hal is a halogen) or $R_3CHO$ when the number of moles of OH group in the alcoholic component is greater than the number of moles of maleic acid (or derivative thereof), and (ii) of formula $R_5OH$ when the number of moles of alcoholic component is less than or less than half of the number of moles of maleic acid (or derivative thereof), the alcoholic component, maleic acid (or derivative) thereof being reacted in any order, to produce an intermediate containing 1 or 2

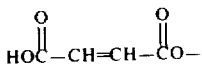

groups per mole and in step (b) reacting the intermediate formed in step (a) with an organotin compound of formula $R_1R_2\,SnO$ or $R_1R_2\,Sn\,Hal_2$.

Compounds of the formula $R_1R_2Sn\,X_2$, $R_1R_2\,Sn\,Y_2$ and $R_1R_2Sn\,XY$, wherein at least one of X and Y is of formula

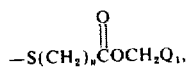

may be prepared by a process which comprises in step (a) reacting an alcoholic component, which is at least one of pentaerythritol and triol of formula $(HOCH_2)_3$ $CR_7$, a mercapto acid of formula $HS(CH_2)_n$ COOH wherein n is an integer of 1 to 6, and one or more blocking agents, which are (i) of formula $R_3COOH$, of formula $R_6(COOH)_2$ and $R_5$ OH or of formula $HOOCR_6COOR_5$ when the number of mole of OH group in the alcoholic component is greater than the number of moles of mercapto acid, and (ii) of formula $R_3CHO$, R CH Hal$_2$ or $R_4$ Hal (wherein Hal is halogen), when the number of moles of triol is less than the number of moles of mercapto acid and when the number of moles of pentaerythritol is less than or less than half of the number of moles of mercapto acid, the alcoholic component, mercapto acid and blocking agent being reacted in any order, to produce an intermediate containing only one SH group per mole, if the alcoholic component is derived from the triol, or 1 or 2 SH groups per mole, if the alcoholic component is derived from pentaerythritol, and in step (b), reacting the intermediate with an organotin compound which is of formula $R_1R_2SnO$ or $R_1R_2\,Sn\,Hal_2$ in an amount of not more than 1 mole of organotin compound per mole of group derived from the pentaerythritol or triol present in the intermediate.

Compounds according to the invention find use as stabilisers for halogen-containing resins.

Accordingly, from a further aspect the present invention provides a composition which comprises a halogen-containing resin (as hereinafter defined) and as a stabiliser therefore at least one compound of the formula

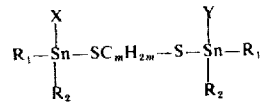

where $R_1$, $R_2$, X, Y and m are as hereinbefore defined, or one prepared by the process of the invention.

In the present specification, halogen-containing resins are defined as polymers or copolymers of vinyl chloride or vinylidene chloride, chlorinated vinyl chloride polymers or chlorinated polyethylene.

The organotin compounds will be present in compositions according to the invention in amounts so as to produce the desired stabilising effect; often this will be 0.01–10%, preferably 0.2–5% especially 2 to 3% by weight based on the total amount of polymeric resin present.

We have also found that by admixing from 1 to 50% by weight (based on the weight of organotin compound of the invention) of a monobutyltin compound e.g. monobutyltin tri (isooctylthioglycollate) with the compounds of the invention, their stabilising efficiency may be enhanced. Other additives which may have a similar effect include monooctyltin tris (iso-octyl thioglycollate), di butyltin sulphide, dioctyltin sulphide, di-n-butyltin cyclic-mercapto acetate, di-n-butyltin cyclic β-mercapto propionate (and their di-n-octyltin analogues).

Optionally, but advantageously, compositions according to the invention also contain at least one hindered phenol, (defined herein as ones having at least one alkyl substituent in a position ortho to the hydroxyl group) as auxilliary stabilisers. Such phenols which are of use in compositions of the present invention include butylated hydroxyanisole, 2,6-di-tert. -butylphenol, methylene bis (2,4-di-tert.-butylphenol), methylene bis-(2,6-di-tert.-butylphenol), methylene bis-(2,6-di-tert,-butyl-3-methylphenol), 4,4'-butylidene bis-(6-tert.-butyl-3-methylphenol), methylene bis- (4-ethyl-6-tert. butylphenol), and methylene bis-(4-methyl-2.6-di-tert.-butylphenol). Particularly preferred, however, is 2,6-di-tert. - butyl-4-methylphenol. Such phenols may be present in an amount of up to 3%, preferably from 0.01 to 0.05% by weight of the resin and will normally be present at about 4–10% by weight, preferably 5–8%, based on the total amount of organotin compounds used.

Esters of phosphorous and thiophosphorous acid may be employed in compositions according to the invention. Such compounds include halo-phosphites such as trischloropropyl phosphite and polymeric phosphites such as those derived from hydrogenated 4,4' - isopropylidenediphenol. Preferred phosphites and thiophosphites, however, are monomers having no substituents in the organo-group and having no more than one sulphur atom. These include triaryl phosphites and trialkyl phosphites. Such compounds include, for example, triphenyl phosphite, trixylylphosphite, tri(nonyl phenyl) phosphite and trioctyl phosphite. Diesters of phosphorous acid such as di-isopropyl phosphite, dibutyl phosphite and diphenyl phosphite are also of use. Particularly preferred, however, are the mixed alkyl aryl phosphites such as octyl diphenyl phosphite, isodecyl diphenyl phosphite and di-isodecyl phenyl phosphite. This particularly pronounced effect may also be obtained by employing a mixture of a triaryl phosphite and an alcohol in conjunction with the organotin compound. A particularly suitable mixture is that of triphenyl phosphite and isodecanol.

The stabiliser composition is also useful if it is employed in a polymer composition containing an epoxy compound, as may be desired for example in cases where a delay of initial colour change is desired. Epoxy compounds which may be employed in such compositions include butyl epoxy stearate, esters of epoxidised oleic acid and compounds of the formula.

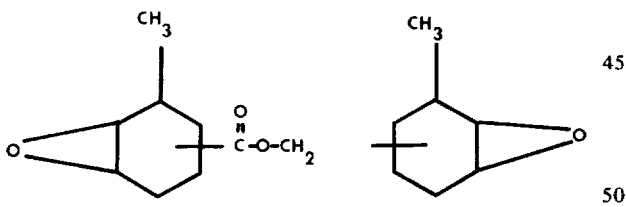

Organotin formulations as described above, optionally including a hindered phenol, an alkylaryl phosphite or aryl phosphate or an epoxide, will often be used as the only stabiliser in a polymeric vinyl chloride or vinylidene chloride composition. However, if desired conventional thermal stabilisers may also be included. These may include, for example, metal soap stabilisers, such as cadmium, barium or zinc salts of fatty acids, or lead salts such as lead carbonate or stearate or dibasic lead phosphate or phthalate, or tribasic lead sulphate or conventional organotin stabilisers such as dibutyltin dilaurate or dibutyltin maleate or sulphur-containing compounds such as dibutyltin bisthioglycollates.

In the practice of the invention the stabiliser formulation may be mixed with the copolymer resin in the conventional manner for example by milling with the resin on heated rolls at 100° – 160°C, eg about 150°C, although higher temperatures may be used when convenient, or by being mixed with particles of the polymer and then melting and extruding the mixture or by adding the stabiliser to a liquid resin.

Resins which may be used in compositions according to the invention normally contain at least 40% by weight of chlorine. Usually it will be a polymer or copolymer of vinyl chloride or vinylidene chloride but post-halogenated polyvinyl chloride or post-halogenated polyolefines, such as polyethylene, may be employed if desired. Suitable monomers, which may form such copolymers with vinyl chloride and vinylidene chloride, include for example acrylonitrile, vinyl acetate, methyl methacrylate, diesters of fumaric acid and maleic acid, ethylene, propylene and lauryl vinyl ether and these co-monomers may be present in an amount of up to 25% of the total weight of monomers copolymerised.

The organotin stabiliser formulation may be employed in either plasticised resin compositions, for example those plasticised with carboxylic ester plasticisers e.g. di-2-ethyl -hexyl phthalate, dibutyl sebacate and di-isooctyl phthalate or phosphate plasticiser e.g. (alkyl aryl) phosphates or may be employed in rigid compositions. Such rigid compositions contain little or no plasticiser although for some applications up to about 10% by weight of plasticiser may be present. This is in contrast with plasticised compositions where the amount of plasticiser present is normally at least 30% e.g. greater than 50% by weight of the polymeric material and is often greater than 100% on that basis eg. up to 150%.

In addition to the stabilizers, the compositions of the invention may also contain conventional additives, e.g. pigments, fillers, dyes and ultraviolet absorbing agents.

The process of the invention will be illustrated by the following examples.

EXAMPLE 1

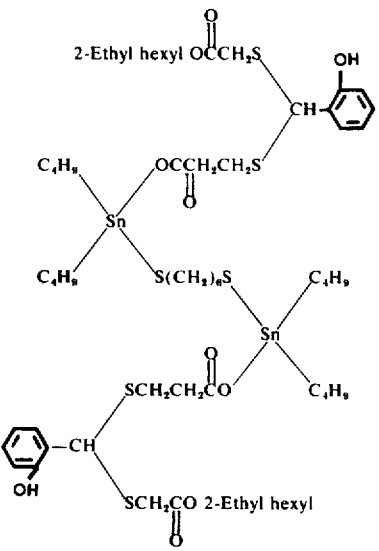

Salicylaldehyde (24.4g, 0.2M), 2 Ethyl hexyl thioglycollate (40.8g, 0.2M) and β-mercaptopropionic acid (21.2g , 0.2M) were refluxed in toluene (150 ml) in presence of p-toluene sulphonic acid (ca 0.1g) till the calculated amount of water had collected to give 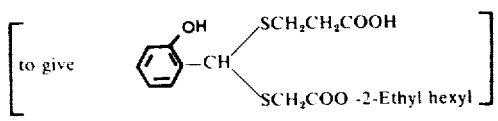

Dibutyltin oxide (24.9 g, 0.1M) was also added into the above warm solution and the mixture reluxed as above to give $(C_4H_9)_2Sn$ 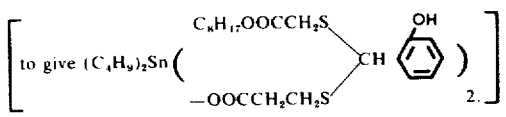

After cooling the solution dibutyltin oxide (24.9g, 0.1M) was further added into the solution and the mixture refluxed until a clear solution was obtained. 1.6-Hexanedithiol (15.0g, 0.1M) was added dropwise by the help of a separating funnel into the above warm solution and the mixture refluxed until the reaction was complete (as in Example 1). The product is a light yellow liquid.

| Analysis | Calculated | Found |
|---|---|---|
| | C = 51.7% | C = 52.65% |
| | H = 7.4% | H = 7.72% |
| | S = 13.3% | S = 13.6% |

Its structure was confirmed by I.R. & N.M.R. analysis.

Example 2

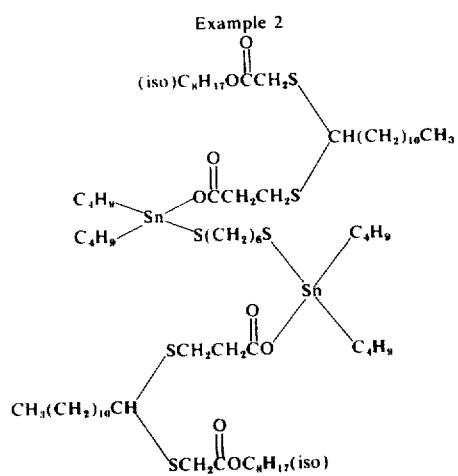

This compound was prepared by the same method as in Example 1 using the following quantities.

| Step (1) | (a) | Dodecylaldehyde | 73.6g |
|---|---|---|---|
| | (b) | β-mercaptopropionic aid | 42.4g |
| | (c) | Iso-octyl thioglycollate | 81.6g |
| | (d) | p-Toluene sulphonic Aid | ca0.2g |
| | (e) | Toluene | 200 ml |
| Step (2) | (f) | Dibutyltin oxide | 49.8g |
| Step (3) | (g) | Dibutyltin oxide | 49.8g |
| Step (4) | (h) | 1,6, Hexane dithiol | 30g |

The product is a light yellow liquid.

| Analysis | Calculated | Found |
|---|---|---|
| | Sn = 15.18% | Sn = 15.4% |
| | S = 12.28% | S = 12.3% |
| | C = 55.26% | C = 55.23% |
| | H = 9.08% | H = 9.27% |

Its structure was also confirmed by I.R. & N.M.R.

Example 3

$$C_8H_{17}\text{-Sn}(X)(X)\text{-Sn-}C_8H_{17}$$
(with S(CH$_2$)$_6$S bridge)

where $X = -O\overset{O}{\overset{\|}{C}}CH_2CH_2S-CH(CH_2)_{10}CH_3$ and $C_8H_{17}O\overset{O}{\overset{\|}{C}}CH_2S-$ This compound was prepared by the same method as example 2 using the following starting materials

| step (1) | (a) | Oc$_2$SnX$_2$ | 129.5g |
|---|---|---|---|
| | (b) | Oc$_2$SnO | 36.07g |
| step (2) | (c) | 1,6-Hexane dithiol | 15g |

The product is a light yellow liquid.

The compound of formula Oc$_2$SnX$_2$ was prepared using the same quantities of starting materials as in steps 1 and 2 of Example 2 and the same method for steps 1 and 2 but replacing dibutyltin oxide by dioctyltin oxide (72.14g).

Example 4

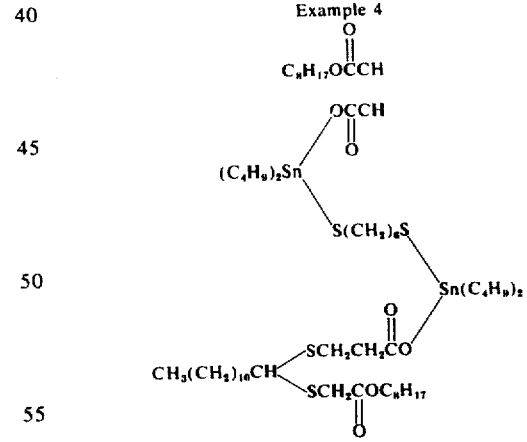

0.1 mole of HOOCCH = CHCOOC$_8$H$_{17}$, 0.1 mole of $CH_3(CH_2)_{10}CH\begin{cases}SCH_2COOC_8H_{17}\\SCH_2CH_2COOH\end{cases}$ (prepared as described in example 2)

and 0.1 mole of Bu$_2$SnO were refluxed in toluene till the completion of reaction as above. The product is a light yellow liquid.

| Analysis | |
|---|---|
| Calculated | Found |
| Sn = 12.7% | Sn = 12.7% |
| S = 6.8% | S = 7.5% |
| C = 57.7% | C = 58.1% |
| H = 9.0% | H = 8.79% |

Its structure was also confirmed by I.R. and N.M.R. 0.1 mole of this product and 0.1 mole (ie. 24.9g) of dibutyltin oxide were refluxed in toluene until a clear solution was obtained. 0.1 mole (15g) of 1,6 Hexane dithiol was also added into the above solution and mixture refluxed until the completion of reaction. The product is a light yellow liquid.

| Analysis | |
|---|---|
| Calculated | Found |
| Sn = 18.0% | Sn = 17.5% |
| S = 9.7% | S = 10.4% |
| C = 53.8% | C = 53.6% |
| H = 8.6% | H = 8.8% |

Its structure was also confirmed by I.R. and N.M.R.

Example 5

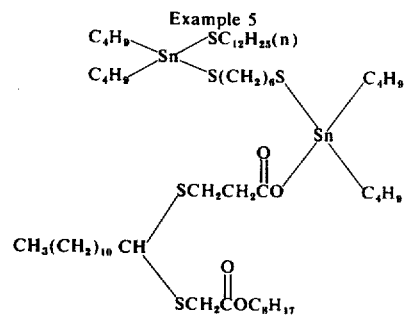

This compound was prepared by the same method as in Example 4 using the following quantities:

step 1 (a)

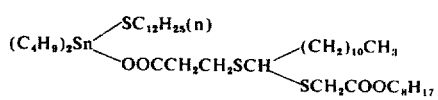

Step 2 (b) dibutyl tin oxide    0.1M
Step 2 (c) 1,6 hexane dithiol   0.1M

The product is a light yellow liquid.

| Analysis | |
|---|---|
| Calculated | Found |
| Sn = 18.4% | Sn = 18.5% |
| S = 12.4% | S = 12.3% |
| C = 54.9% | C = 54.6% |
| H = 9.3% | H = 9.5% |

Its structure was also confirmed by I.R. and N.M.R. analysis.

The organotin compound used in step 1 (a) was prepared as follows:

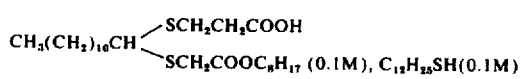

and Bu$_2$Sn O (0.1M) were refluxed in toluene (150 ml) until the reaction was complete. The product is a light yellow liquid.

| Analysis | |
|---|---|
| Calculated | Found |
| Sn = 13.0% | Sn = 12.9% |
| S = 10.5% | S = 11.2 |
| C = 59.4 | C = 59.5 |
| H = 9.9 | H = 9.5 |

Its structure was also confirmed by I.R. and N.M.R.

Example 6

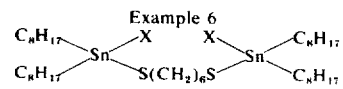

where

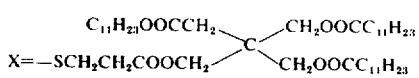

It was prepared by the same method as in Example 5 using the following quantities:

| Step (1) | (a) | $(C_8H_{17})_2SnX_2$ | 37.7g | (0.02M) |
|---|---|---|---|---|
| | (b) | $(C_8H_{17})_2SnO$ | 7.2g | (0.02M) |
| Step (2) | (c) | $HS(CH_2)_6SH$ | 3g | (0.02M) |

The product is a white soft waxy solid at room temperature.

The compound of formula $(C_8H_{17})_2$ Sn $X_2$ was prepared as follows.

Pentaerythritol (27.2g, 0.2M), Lauric acid (122.4g, 0.6M) and β-mercaptopropionic acid (21.2g, 0.2M) were refluxed in toluene (200ml) with constant stirring in the presence of p-toluene sulphonic acid (0.7g) until the calculated amount of water had collected in a Dean & Stark apparatus. Toluene was removed from the hot solution under reduced pressure, and finally the intermediate product A (ieHSCH$_2$CH$_2$COOCH$_2$ —c—(c-$_{H2}$OOCC$_{11}$H$_{23}$)$_3$ rapidly filtered under vacuum. The product on keeping at room temperature becomes a soft waxy solid.

64g (0.08M) of Intermediate product A and 14.4 g (0.04M) of dioctyltin oxide were heated together with constant stirring (without any solvent) for about two hours. Water was removed from the hot liquid under reduced pressure and finally the hot liquid filtered under vacuum. A white soft waxy solid was obtained.

| Calculated | Found |
|---|---|
| Sn = 6.3% | Sn = 6.2% |
| S = 3.4% | S = 3.7% |
| C = 66.3% | C = 67.2% |
| H = 10.4% | H = 10.38% |

Its structure was also confirmed by I.R. & N.M.R. analysis.

| Analysis of bis tin compound Calculated | Found |
|---|---|
| Sn = 9.9% | Sn = 9.8% |
| S = 5.4% | S = 6.1% |
| C = 63.6% | C = 63.31% |
| H = 10.1% | H = 10.4% |

Its structure was also confirmed by N.M.R. analysis.

Example 7

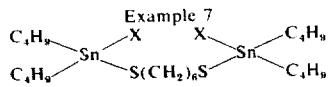

where X =

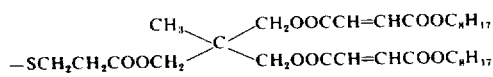

It was prepared by the same method as in Example 6 using the following quantities:

| step (1) | (a) $Bu_2SnX_2$ | =0.1M |
|---|---|---|
|  | (b) $Bu_2SnO$ | =0.1M |
| step (2) | (c) $HS(CH_2)_6SH$ | =0.1M |

The product is a light yellow viscous liquid.

| Analysis Calculated | Found |
|---|---|
| Sn = 12.7% | Sn = 12.9% |
| S = 6.8% | S = 7.3% |

The compound of formula $Bu_2Sn X_2$ was prepared as follows:

Maleic anhydride (19.6g, 0.2M) and iso-octyl alcohol (26g, 0.2M) were heated under reflux in toluene (200ml) for two hours to give product F ie ($HOOCCH = CHCOOC_8H_{17}$)

β-mercaptopropionic acid (10.6g, 0:1M), 1,1,1 - Trimethylol ethane (11.8, 0.1M) and p-toluene sulphonic acid (0.5g) were added into the above solution (containing F) to give product G ie.

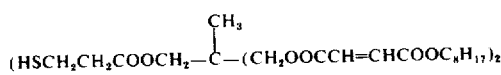

Dibutyltin oxide (12.5g, 0.05M) was also added into the above solution (containing G) and the mixture refluxed to give the desired product. Toluene was removed from the solution as usual and a light yellow viscous liquid was obtained.

| Analysis: | Calculated | Found |
|---|---|---|
|  | Sn = 7.9% | Sn = 8.29% |
|  | S = 4.4% | S = 4.67% |
|  | C = 58.1% | C = 57.6% |
|  | H = 8.0% | H = 7.99% |

EXAMPLE 8

The stabilizers of the present invention can be used with halogen containing vinyl and vinylidene resins in which the halogen is attached directly to the carbon atoms of the polymer chain. Preferably, the resin is vinyl halide resin, especially a vinyl chloride, resin.

A number of compounds of the present invention were tested for initial colour development against known stabilisers on an equal tin basis and it was shown that they compared favourably (see Table 1).

The example illustrates the stabilising effect of the compounds of the present invention (with and without additives) in comparison with known stabilisers (ie Mellite - 31c) containing equal amount of tin in rigid P.V.C. composition.

A series of rigid (non-plasticized) formulation was prepared having following composition:
a. Corvic D55/9 100 parts.
b. Plasticube 30: Marked T if added and the amount present in part per 100 parts of polymer are indicated inside the brackets. In many instances of the present invention plastilube has not been added to the polymer due to the reason that many of the compounds tested are themselves acting as a lubricant during milling at about 155°C
c. Stabilisers and additives
All examples in Table 1 have been tested (with and without additives) separately in comparison with mellite 31c containing equal amount of tin in definite amount of Corvic D55/9 (usually 300 gms).

| Symbols are as follows: | | |
|---|---|---|
| A | represent | B.E.S. (Butyl epoxy stearate) |
| L | " | M31C (Mellite 31C) |
| B | " | $BuSn(SCH_2COOC_nH_{17})_3$ |
| R | " | $OcSn(SCH_2COOC_nH_{17})_3$ |
| 1 | " | $Bu_2SnS$ |
| G | " | $Bu_2Sn\!\!<\!\!{{S-CH_2}\atop{O}}\!\!>\!\!C-O$ |
| T | " | Plastilube 30 |

Table 1

| STABILISER ( )denotes wt. % | PARTS OF STABILISERS PhD | Colour on Gardener Scale after given time in minutes at 190°C | | | | |
|---|---|---|---|---|---|---|
|  |  | 0 | 5 | 10 | 15 | 20 |
| Product of Ex. 1 (95) +B(5)+T(0.5) | 1.66 | 0 | 0 | 1 | 3 |  |
| Product of Ex. 1 (95) + B(5)+A(20)+T(0.5) | equivalent to the above | 0 | 0 | 1 | 3 |  |
| Product of Ex. 1 (95) +B(5)+L(20)+T(0.5) | " | 0 | 0 | 0 | 3 |  |
| Product of Ex. 1 (95) +B(5)+L(20)+A(20)+T(0.5) | " | 0 | 0 | 0 | 2-3 |  |
| Mellite 31C+T(0.5) | " | 0 | 0 | 3 | 5 |  |

Table 1-continued

| STABILISER ( )denotes wt. % | PARTS OF STABILISERS PhD | Colour on Gardener Scale after given time in minutes at 190°C | | | | |
|---|---|---|---|---|---|---|
| | | 0 | 5 | 10 | 15 | 20 |
| Product of Ex. 2 (95) +B(5)+T(0.5) | 1.6 | 0 | 0 | 1 | 2 | |
| Product of Ex. 2 (90) +B(5)+I(5)+T(0.5) | equivalent to the above | 0 | 0 | 0–1 | 2 | |
| Product of Ex. 2 (95) B(5)+L(25)+T(0.5) | " | 0 | 0 | 0 | 2 | |
| Product of Ex. 2 (95) +B(5)+A(15)+T(0.5) | " | 0 | 0 | 1 | 2–3 | |
| Mellite 31C+T(0.5) | " | 0 | 0 | 1 | 5 | |
| Thermallite 31+T(0.5) | 2 Parts | 0 | 0–1 | 4 | 6 | |
| Product of Ex. 4 (95) +B(5) | tin equivalent to above | 0 | 0 | 0–1 | 2 | |
| Mellite 31C+T(0.5) | " | 0 | 0 | 1 | 3 | |

We claim:

1. A stabilized polymer composition which comprises at least one resin containing at least 40% by weight of chlorine and selected from the group consisting of homopolymers of vinyl chloride and vinylidene chloride, postchlorinated polyolefins and copolymers of vinyl chloride or vinylidene chloride with up to 25%, based on the total weight of monomers, of other copolymerizable monomers, and as stabilizer therefor 0.01 – 10% by weight (based on the weight of the polymer) of an organothiotin compound of the formula

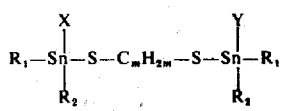

wherein each of $R_1$ and $R_2$, which are the same or different, is an alkyl group of 1–20 carbon atoms, a cycloalkyl or phenyl group; $m$ is an integer of 1–8; each of X and Y, which are the same or different exhibits the formula

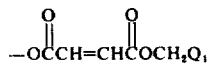

or

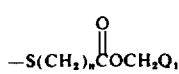

or

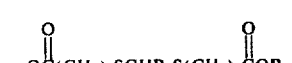

or

or and optionally not more than one of either X or Y may be $SR_4$

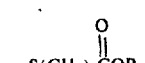

wherein $Q_1$ is of formula

and $Q_2$ is hydrogen, an alkyl group of 1 to 6 carbon atoms or $CH_2Z_3$, in which $Z_3$ is as defined for $Z_1$ or $Z_2$ below, and each of $Z_1$ and $Z_2$, which are the same or different, exhibits the formula

a pair of radicals selected from the group consisting of $Z_1$, $Z_2$ and $Z_3$ forms a group of formula

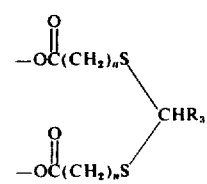

wherein $R_3$ is an alkyl group of 1 to 20 carbon atoms, a substituted or unsubstituted phenyl group or an alkyl phenyl group, which is substituted or unsubstituted, or two $R_3$ groups form a single bond between two carbon atoms, an alkylene group of 1 to 20 carbon atoms, an alkenylene group of 2 to 20 carbon atoms or a substituted or unsubstituted phenyl group; $R_4$ is an alkyl group of 1 to 20 carbon atoms or a substituted or unsubstituted phenylalkyl group with 1 to 6 carbon atoms in the alkyl group, or two $R_4$ groups are bonded together to form an alkylene group of 1 to 20 carbon atoms which is unsubstituted or substituted by at least one phenyl group, or an alkenylene group of 2 to 20 carbon atoms or a cycloalkylene group of 5 or 6 carbon atoms; $R_5$ is an alkyl group of 1 to 20 carbon atoms, a substituted or unsubstituted phenyl group or an alkylphenyl group which is substituted or unsubstituted, or two $R_5$ groups are bonded together to form an alkylene group of 1 to 20 carbon atoms; $R_6$ is a single bond, an alkylene group of 1 to 20 carbon atoms or an alkenylene group of 2 to 20 carbon atoms or a substituted or unsubstituted phenylene group and each of $a$ and $n$, which are the same or different, is an integer of 1 to 6.

2. A compound according to claim 1 wherein each of X and Y, which are the same or different, is of formula

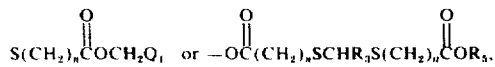

or only one of X and Y is of formula $-SR_4$ or

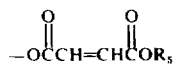

and the other is as defined above.

3. A composition according to claim 1 wherein $Q_1$ is of formula

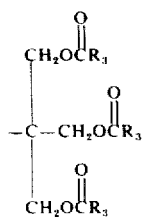 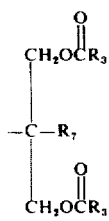

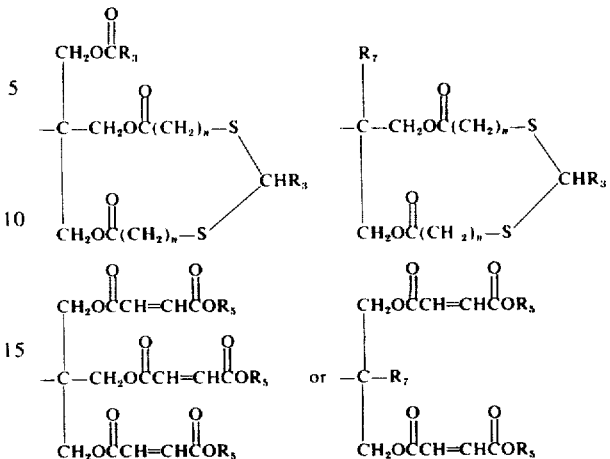

wherein $R_7$ is hydrogen or an alkyl group of 1 to 6 carbon atoms.

4. A composition according to claim 2 which comprises 1–50% by weight (based on the weight of the organothiotin compound) of monobutyltin tri(isooctylthioglycollate).

5. A composition according to claim 1 which comprises 1–50% by weight (based on the weight of organothiotin compound) of at least one of di(n-butyl)tin cyclic mercapto acetate, di(n-octyl)tin cyclic mercapto acetate, di(n-butyl)tin cyclic β mercapto propionate and di(n-octyl)tin cyclic β mercapto propionate.

6. A composition according to claim 1 which comprises 0.01–3% by weight (based on the weight of the resin) of at least one hindered phenol.

* * * * *

Page 1 of 2

UNITED STATES PATENT AND TRADEMARK OFFICE
CERTIFICATE OF CORRECTION

PATENT NO. : 3,933,750
DATED : JANUARY 20, 1976
INVENTOR(S) : HAROLD COATES et al

It is certified that error appears in the above-identified patent and that said Letters Patent are hereby corrected as shown below:

Page 1, after line [21], insert:
--[30] Foreign Application Priority Data
    May 10, 1972    United Kingdom......21826/72--.

Page 1, in the ABSTRACT, seventh line from the bottom of the column, insert the word --phenyl-- after "optionally" so that the line reads:
"groups $R_4$ are optionally phenyl substituted $C_1$-20 alkylene,".

Column 12, line 42, replace the formula with the following formula:

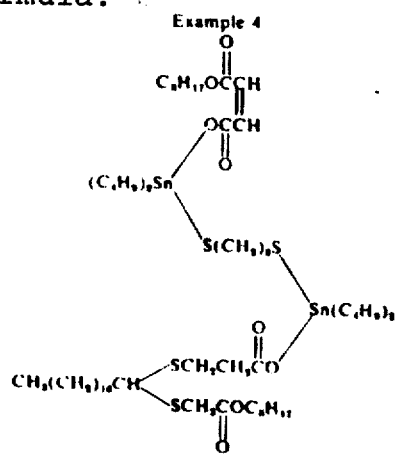

UNITED STATES PATENT AND TRADEMARK OFFICE
CERTIFICATE OF CORRECTION

PATENT NO. : 3,933,750
DATED : JANUARY 20, 1976
INVENTOR(S) : HAROLD COATES et al

It is certified that error appears in the above-identified patent and that said Letters Patent are hereby corrected as shown below:

Column 17, line 56, replace "$COR_3$" with --$COR_5$--.

Signed and Sealed this

Fourth Day of July 1978

[SEAL]

Attest:

RUTH C. MASON
Attesting Officer

DONALD W. BANNER
Commissioner of Patents and Trademarks